(12) United States Patent
Kim et al.

(10) Patent No.: US 10,950,870 B2
(45) Date of Patent: Mar. 16, 2021

(54) METHOD FOR PRODUCING ALLOY CATALYST FOR FUEL CELLS USING SILICA COATING

(71) Applicant: INDUSTRY-ACADEMIC COOPERATION FOUNDATION, YONSEI U, Seoul (KR)

(72) Inventors: Hansung Kim, Seoul (KR); Jonggil Oh, Incheon (KR)

(73) Assignee: INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 0 days.

(21) Appl. No.: 16/585,941

(22) Filed: Sep. 27, 2019

(65) Prior Publication Data

US 2020/0028184 A1    Jan. 23, 2020

Related U.S. Application Data

(63) Continuation of application No. 14/236,220, filed as application No. PCT/KR2012/000326 on Jan. 13, 2012, now abandoned.

(30) Foreign Application Priority Data

May 13, 2011   (KR) .................. 10-2011-0045164

(51) Int. Cl.
*H01M 4/92* (2006.01)
*H01M 4/86* (2006.01)
*H01M 8/1018* (2016.01)

(52) U.S. Cl.
CPC ......... *H01M 4/926* (2013.01); *H01M 4/8605* (2013.01); *H01M 4/921* (2013.01); *H01M 2008/1095* (2013.01)

(58) Field of Classification Search
CPC ... B01J 23/40; B01J 23/56; B01J 23/42; B01J 23/8913; H01M 4/88; H01M 4/8605;
(Continued)

(56) References Cited

U.S. PATENT DOCUMENTS 7,659,224 B2    2/2010   Shimazaki et al.
8,334,014 B1 *  12/2012  Petsev ................. H01M 4/8842
                                                      427/212
(Continued)

FOREIGN PATENT DOCUMENTS

KR        10-0752265 B1    8/2007

OTHER PUBLICATIONS

Cui et al., "PtCo supported on ordered mesoporous carbon as an electrode catalyst for methanol oxidation", Sci Dir., Carbon 47, 2009, pp. 186-194.
(Continued)

*Primary Examiner* — Stephen J Yanchuk
(74) *Attorney, Agent, or Firm* — Womble Bond Dickinson (US) LLP (57) ABSTRACT

Disclosed is a method for producing an alloy catalyst supported on carbon, including the steps of: dispersing alloy particles into a mixed solution of water with alcohol, introducing a silica precursor thereto, and carrying out sol-gel reaction in the presence of a basic catalyst to obtain silica-coated alloy particles; supporting the silica-coated alloy particles onto a carbon carrier to obtain silica-coated alloy particles supported on carbon; heat treating the silica-coated alloy particles supported on carbon to increase an alloying degree; and removing silica coating by using inorganic base solution and a surfactant. The method for producing an alloy catalyst provides a high-quality and high-durability alloy catalyst by increasing the alloying degree of a catalyst through a heat treatment step, while forming a silica coating (Continued)

layer effectively on small alloy particles having a size of several nanometers to inhibit growth of the size of alloy particles. In addition, the catalyst may be used advantageously as an electrode for fuel cells.

4 Claims, 7 Drawing Sheets

(58) Field of Classification Search
CPC ........ H01M 4/921; H01M 4/926; H01M 4/90; H01M 2008/1095
See application file for complete search history.

(56) References Cited

U.S. PATENT DOCUMENTS

| | | | | |
|---|---|---|---|---|
| 8,912,114 | B2* | 12/2014 | Mukerjee | H01M 4/921 502/182 |
| 2004/0116279 | A1 | 6/2004 | Addiego et al. | |
| 2006/0116284 | A1* | 6/2006 | Pak | C04B 35/521 502/180 |
| 2008/0026275 | A1 | 1/2008 | Kourtakis et al. | |
| 2009/0011311 | A1 | 1/2009 | Alexandrovichserov et al. | |
| 2009/0291352 | A1* | 11/2009 | Oshihara | H01M 4/926 429/518 |
| 2009/0312180 | A1 | 12/2009 | Chien et al. | |
| 2010/0055002 | A1 | 3/2010 | Lee | |
| 2013/0330658 | A1 | 12/2013 | Palmqvist et al. | |

OTHER PUBLICATIONS

Li et al., "Nano-structured Pt—Fe/C as cathode catalyst in direct methanol fuel cell", Electrochimica Acta, vol. 49, 2004, pp. 1045-1055.

Salgado et al., "Carbon supported Pt70Co30 electrocatalyst prepared by the formic acid mehtod for the oxygen reduction reaction in polymer electrolyte fuel cells", Journal of Power Sources, vol. 141, 2005, pp. 13-18.

Xiong et al., "Nanostructured Pt—M/C (M=Fe and Co) catalysts prepared by a microemulsion method for oxygen reduction in proton exchange membrane fuel cells", Electrochimica Acta, vol. 50, 2005, pp. 2323-2329.

Yang et al., "Tailoring, Structure, and Activity of Carbon-Supported Nanosized Pt—Cr Alloy Electrocatalysts for Oxygen Reduction in Pure and Methanol-Containing Electrolytes", J. Phys. Chem. B, vol. 108, 2004, pp. 1938-1947.

International Search Report and Written Opinion dated Sep. 28, 2012 for Application No. PCT/KR2012/000326.

* cited by examiner

METHOD FOR PRODUCING ALLOY CATALYST FOR FUEL CELLS USING SILICA COATING

CROSS-REFERENCE TO RELATED APPLICATIONS

This application is a continuation application of U.S. application Ser. No. 14/236,220, filed Jan. 30, 2014, which is a national stage application filed under 35 U.S.C. 371 of International Application No. PCT/KR2012/000326, filed Jan. 13, 2012, which claims priority to Korean Patent Application No. 10-2011-0045164, filed May 13, 2011, each of which is incorporated herein in its entirety.

TECHNICAL FIELD

The present disclosure relates to a method for producing an alloy catalyst for fuel cells using silica coating. More particularly, the present disclosure relates to a method for producing an alloy catalyst for fuel cells, including forming a silica coating layer on alloy particles, carrying out heat treatment, and then removing silica to inhibit growth of particle size while enhancing catalytic activity and alloying degree.

BACKGROUND ART

Fuel cells are energy conversion devices which convert chemical energy of fuel directly into electric energy, have higher efficiency as compared to conventional internal combustion engines, and show high energy density and eco-friendly characteristics. Thus, many attentions have been given to such fuel cells.

Polymer electrolyte membrane fuel cells (PEMFC) and direct methanol fuel cells (DMFC) are operated at a low temperature of 80° C. or less in general, and thus an electrode catalyst is required in order to increase the rate of oxidation and reduction in fuel cells. Particularly, platinum is the only catalyst that can accelerate oxidation of fuel (hydrogen or alcohol) and reduction of oxygen up to a temperature of approximately 100° C., and thus has been used frequently as an electrode catalyst for fuel cells. However, since the deposit of platinum is limited and platinum is expensive, it is important to reduce the use of platinum or to maximize the catalytic activity per unit mass for the purpose of commercialization of fuel cells.

To accomplish this, many studies have been conducted about platinum alloy catalysts supported on carbon. Platinum alloy catalysts have higher activity and stability by virtue of the electrical and structural characteristics of the surface of particles in principle, and thus have been spotlighted as a reliable substitute for fuel cell electrode materials.

In general, platinum alloy catalysts supported on carbon are obtained by depositing a transition metal precursor on a platinum catalyst supported on carbon as a starting material and carrying out heat treatment at 700-1200° C. by using a gaseous reducing agent such as hydrogen. However, such heat treatment causes an increase in size of alloy particles, resulting in degradation of catalytic activity.

Under these circumstances, many studies have been conducted about methods for producing an alloy catalyst without heat treatment at high temperature, the method including: a chemical reduction process (J. Power Sources 141 (2005), 13), carbonyl complex process (J. Phys. Chem. B 108 (2004), 1938), microemulsion process (Electrochim. Acta 50 (2005), 2323), and a polyol process (Electrochim. Acta 49 (2004), 1045). However, the alloy catalysts obtained by the above processes are problematic in that a significant amount of non-alloyed transition metal is present on the particle surface and is leached out easily during the operation of a fuel cell, resulting in degradation of catalytic activity and durability.

Therefore, it is essential to carry out a heat treatment process at high temperature in order to obtain an alloy catalyst satisfying high catalytic activity and durability applicable to fuel cell catalysts. In addition to this, a novel process by which the growth of particle size is inhibited is required.

DISCLOSURE

Technical Problem

A technical problem to be solved by the present disclosure is to provide a method for producing an alloy catalyst, including carrying out heat treatment at high temperature to increase an alloying degree and catalytic activity while controlling the size of alloy particles to several nanometers.

Another technical problem to be solved by the present disclosure is to provide an electrode for fuel cells including the alloy catalyst obtained by the above method and fuel cells using the same.

Technical Solution

In one general aspect, there is provided a method for producing an alloy catalyst supported on carbon, including the steps of:

(1) dispersing alloy particles into a mixed solution of water with alcohol, introducing a silica precursor thereto, and carrying out sol-gel reaction in the presence of a basic catalyst to obtain silica-coated alloy particles;

(2) supporting the silica-coated alloy particles onto a carbon carrier to obtain silica-coated alloy particles supported on carbon;

(3) heat treating the silica-coated alloy particles supported on carbon to increase an alloying degree; and (4) removing silica coating by using aqueous hydrofluoric acid (HF) solution or inorganic base solution and a surfactant.

According to an embodiment, the alloy particle includes an alloy of at least two metals selected from platinum, palladium, gold, iridium, ruthenium, vanadium, chrome, manganese, iron, cobalt, nickel, copper, zinc and titanium, preferably platinum-cobalt alloy particle.

According to another embodiment, the silica precursor may be selected from TEOS (tetraethyl orthosilicate), TMOS (tetramethyl orthosilicate), TBOS (tetrabutyl orthosilicate) and a mixture thereof, and preferably TEOS (tetraethyl orthosilicate).

According to still another embodiment, the alloy particles may have a size of 2-10 nm and the silica coating layer may have a thickness of 3-50 nm.

According to still another embodiment, the basic catalyst in the sol-gel reaction may be selected from aqueous ammonia, sodium hydroxide and potassium hydroxide, preferably ammonia.

According to still another embodiment, the silica coating layer may be formed by carrying out the sol-gel reaction at 10-50° C. for 3-48 hours under agitation.

According to still another embodiment, the carbon carrier may be at least one selected from carbon black, carbon nanotubes, carbon nanofibers, carbon nanocoils and carbon nanocages.

According to still another embodiment, the heat treatment in step (3) may be carried out under inert gas atmosphere such as argon or nitrogen, or mixed gas atmosphere of argon or nitrogen with hydrogen, preferably 90 vol % of argon with 10 vol % of hydrogen.

According to still another embodiment, the heat treatment in step (3) may be carried out at 400-1000° C. for 2-4 hours, preferably at 750-850° C. for 3 hours to increase an alloying degree.

According to still another embodiment, the aqueous inorganic base solution may be aqueous sodium hydroxide (NaOH) solution or aqueous potassium hydroxide (KOH) solution, and aqueous hydrofluoric acid solution, sodium hydroxide solution or potassium hydroxide solution (preferably, aqueous hydrofluoric acid solution) may be used in step (4) to remove silica coating.

According to yet another embodiment, the surfactant may be a non-ionic surfactant selected from polyoxyethylene glycol sorbitan fatty acid esters, sorbitan fatty acid esters, aliphatic alcohols and polyoxyethylene alkyl ethers.

In a variant, there is provided a method for producing an alloy catalyst supported on carbon, including, instead of step (2), a step of supporting the alloy particles from which the silica coating is removed onto a carbon carrier after step (4).

In other words, there is provided a method for producing an alloy catalyst supported on carbon, including the steps of:

(1') dispersing alloy particles into a mixed solution of water with alcohol, introducing a silica precursor thereto, and carrying out sol-gel reaction in the presence of a basic catalyst to obtain silica-coated alloy particles;

(2') heat treating the silica-coated alloy particles supported on carbon to increase an alloying degree;

(3') removing silica coating by using aqueous hydrofluoric acid (HF) solution or inorganic base solution and a surfactant; and (4') supporting the silica-coated alloy particles onto a carbon carrier to obtain silica-coated alloy particles supported on carbon.

In another general aspect, there are provided an electrode for fuel cells including the alloy catalyst supported on carbon obtained by the above-mentioned method, and a fuel cell using the same.

Advantageous Effects

According to the method for producing an alloy catalyst of the present disclosure, it is possible to obtain a high-quality and high-durability alloy catalyst by increasing the alloying degree of a catalyst through a heat treatment step, while forming a silica coating layer effectively on small alloy particles having a size of several nanometers to inhibit growth of the size of alloy particles. In addition, the catalyst obtained by the method may be used advantageously as an electrode for fuel cells.

BEST MODE

Exemplary embodiments now will be described more fully hereinafter with reference to the accompanying drawings, in which exemplary embodiments are shown.

The method for producing an alloy catalyst according to the present disclosure is characterized in that a silica coating layer is formed on alloy particles and heat treatment is carried out to increase the alloying degree of alloy particles, while silica is removed after the silica coating and heat treatment to inhibit the growth of alloy particle size, thereby providing an alloy catalyst having a high alloying degree and catalytic activity.

In general, alloy particles are obtained by a NaBH$_4$ reduction process using a strong reducing agent. However, in this case, a difference in reduction rate between different metals causes a drop in alloying degree, transition metals used as general heterogeneous metals are present on the alloy surface at a high ratio, and most of transition metals present on the surface are leached out under the operation environment of a fuel cell due to a low equilibrium potential, resulting in degradation of catalytic activity and durability. In addition, when increasing the alloying degree of an alloy catalyst, the ratio of transition metals present on the catalyst surface is reduced, and thus the catalytic activity is increased and durability is also improved. However, in order to increase the alloying degree of an alloy catalyst, a heat treatment process is essentially required but heat treatment at high temperature is problematic in that it causes an increase in particle size, leading to a decrease in catalytically active area.

Therefore, the method for producing an alloy catalyst according to the present disclosure includes the steps of introducing silica during the heat treatment as a capping agent to increase the alloying degree of a catalyst, while inhibiting the growth of particle size, so that the alloy particles are coated with silica, carrying out heat treatment, and removing the silica coating.

According to the present disclosure, the method includes the steps of: preparing alloy particles, coating the alloy particles with silica, supporting the silica-coated alloy particles on a carrier, heat treating the catalyst supported on the carrier, and removing the silica coating layer. In brief, a silica layer is coated on alloy particles, followed by heat treatment, and then silica is removed, so that an alloy catalyst supported on a carrier can be obtained efficiently.

An embodiment of the method according to the present disclosure will now be explained in more detail referring to FIG. 1. The method includes the steps of: (1) dispersing alloy particles into a mixed solution of water with alcohol, introducing a silica precursor thereto, and carrying out sol-gel reaction in the presence of a basic catalyst to obtain silica-coated alloy particles; (2) supporting the silica-coated alloy particles onto a carbon carrier to obtain silica-coated alloy particles supported on carbon; (3) heat treating the silica-coated alloy particles supported on carbon to increase an alloying degree; and (4) removing silica coating by using aqueous hydrofluoric acid solution or inorganic base solution and a surfactant.

The metals for use in alloying may be selected from the group consisting of any combinations of platinum (Pt), palladium (Pd), gold (Au), iridium (Ir), ruthenium (Ru), vanadium (V), chrome (Cr), manganese (Mn), iron (Fe), cobalt (Co), nickel (Ni), copper (Cu), zinc (Zn) or titanium (Ti). In addition, there is no particular limitation in the method for preparing alloy particles, and examples of the method include known processes such as chemical reduction process using a reducing agent, alcohol reduction process, polyol process, or the like.

In step (1), the surface of alloy particles is coated with silica, wherein the alloy particles are dispersed into a mixed solution of water with alcohol and a silica precursor is introduced thereto to obtain silica-coated alloy particles.

Preferably, a lower alcohol is used as the alcohol in step (1) since it has high miscibility with water and facilitates the formation of a silica coating layer through a sol-gel reaction of silica precursor. When the silica precursor is added to the solution in which the alloy is dispersed and the resultant mixture is agitated, a silica coating layer is formed on the alloy particles through a sol-gel reaction in the presence of a basic catalyst.

As the silica precursor, TEOS (tetraethyl orthosilicate), TMOS (tetramethyl orthosilicate), TBOS (tetrabutyl orthosilicate) or a combination thereof is used preferably. As the catalyst for the silica sol-gel reaction, a basic compound such as aqueous ammonia ($NH_4OH$), sodium hydroxide (NaOH) or potassium hydroxide (KOH) is used preferably.

The silica layer formed in step (1) preferably has a thickness of 3-50 nm. When the thickness is less than 3 nm, it is difficult to prevent the growth of alloy particles completely during the heat treatment. When the thickness is larger than 50 nm, it is not easy to remove the silica layer subsequently.

The agitation is carried out preferably for 3-48 hours at a temperature of 10-50° C., but is not limited thereto.

In step (2), silica-coated alloy particles are supported on a carrier. The carrier that may be used herein is not particularly limited, but at least one selected from carbon black, carbon nanotubes, carbon nanocoils and carbon nanocages is used preferably in view of the supportability and dispersibility of a catalyst. There is no particular limitation in the method for supporting the silica-coated alloy particles on the carrier. For example, the silica-coated alloy particles are mixed with the carrier in an adequate solvent, followed by agitation. Also, there is no particular limitation in the solvent that may be used herein.

In step (3), the catalyst supported on a carrier is heat treated. The alloy particles have an increased alloying degree and the ratio of transition metals present on the particle surface is decreased through the heat treatment step. The solvent contained in the catalyst supported on a carrier is removed by using a freeze dryer or rotary evaporator under vacuum, before the heat treatment is carried out.

In addition, the heat treatment step is preferably carried out under inert gas atmosphere such as argon or nitrogen, or mixed gas atmosphere of inert gas with hydrogen. More preferably, the heat treatment step is carried out under mixed gas atmosphere of 90 vol % of argon with 10 vol % hydrogen.

Further, the heat treatment step is preferably carried out at a temperature of 400-1000° C. When the heat treatment temperature is less than 400° C., it is not possible to improve the alloying degree sufficiently, resulting in a limited increase in catalytic activity. When the heat treatment is excessively high (>1000° C.), it is not possible to inhibit the growth of particle size sufficiently, resulting in degradation of catalytic activity.

In step (4), the silica coating layer is removed to obtain an alloy catalyst supported on carbon. Aqueous hydrofluoric acid (HF) solution or aqueous solution of inorganic base such as sodium hydroxide (NaOH) or potassium hydroxide (KOH) is used to remove silica.

While silica is removed, the alloy particles contained in the silica layer in step (4) are dispersed in the surrounding solution. Herein, a surfactant is used preferably to improve the dispersibility. There is no particular limitation in the surfactant that may be used herein. In view of dispersibility and easy removability, non-ionic surfactants including polyoxyethylene glycol sorbitan fatty acid esters, sorbitan fatty acid esters, aliphatic alcohols, or polyoxyethylene alkyl ethers are used preferably. More preferably, a non-ionic surfactant such as polyoxyethylene (20) sorbitan monolaurate (Tween 20) is used.

When producing an alloy catalyst supported on carbon according to the present disclosure, step (2) of supporting the catalyst on a carbon carrier may be carried out after the alloy particles from which the silica coating is removed are obtained in step (4), if desired.

In another aspect, the present disclosure provides an electrode for fuel cells including the alloy catalyst supported on carbon obtained by the above-described method, and a fuel cell using the same.

The alloy catalyst obtained according to the present disclosure has a high alloying degree and the growth of particle size thereof is inhibited to provide high quality and high durability. Thus, the alloy catalyst according to the present disclosure may be used advantageously for an electrode for fuel cells and for a fuel cell.

MODE FOR INVENTION

The examples and comparative examples will now be described in detail. The following examples are for illustrative purposes only and it will be understood by those skilled in the art that the scope of the present disclosure is not limited thereto.

[Example 1] Preparation of PtCo/C Using Silica Coating Process

First, 50 mg of $PtCl_4$ and 17.6 mg of $CoCl_2.6H_2O$ are dissolved into 100 ml of ultrapure water and the mixture is agitated for 20 minutes. Next, 2.2 g of polyvinyl pyrrolidone (PVP, molecular weight: ~10,000) is dissolved into 100 ml of ultrapure water, treated with ultrasonic waves for 15 minutes, and then is mixed with the above metal precursor solution. Then, 37.35 mg of $NaBH_4$ is mixed with 10 ml of ultrapure water and added to the solution obtained as mentioned above, followed by agitation for about 12 hours.

After the completion of reduction, platinum-cobalt alloy particles (PtCo) are recovered by using a centrifugal separator and redispersed into 160 ml of ethanol mixed with water. Then, 1.6 ml of TEOS is mixed with 14.4 ml of ethanol and the mixture is introduced to the alloy solution, followed by agitation for 10 minutes. After that, 7.8 ml of aqueous ammonia is added thereto and agitated for about 24 hours to perform coating of PtCo with silica.

PtCo (PtCo@$SiO_2$) on which a silica layer is formed is recovered by using a centrifugal separator and redispersed into 200 ml of ethanol. Then, 31.8 mg of Ketjen black EC300j is added thereto as a carrier and agitated for 12 hours. Then, the resultant product is recovered by using a freeze dryer.

The silica-coated alloy particles supported on the carrier (PtCo@$SiO_2$/C) are introduced to a furnace and heat treated under the atmosphere of air at 400° C. for 30 minutes to remove impurities such as PVP. To increase the alloying degree, heat treatment is carried out at 800° C. under the atmosphere of 90 vol % of argon and 10 vol % of hydrogen for 3 hours.

After the completion of heat treatment, the sample is introduced to 300 ml of 1% aqueous HF solution in which 300 mg of Tween 20 is dissolved and agitated for 3 hours to dissolve out silica. The resultant alloy catalyst is washed sufficiently with ultrapure water and ethanol alternately, and dried at 80° C. for about 12 hours (PtCo/C).

Figure 1:
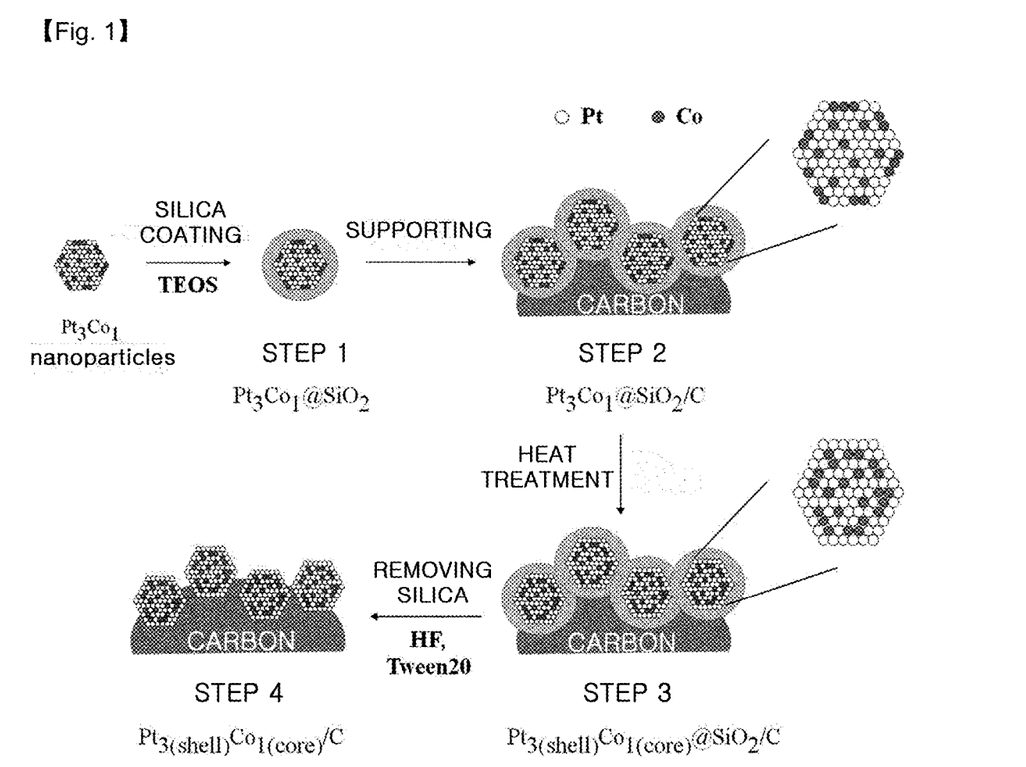
FIG. 1 is a schematic view illustrating each step of the method for producing an alloy catalyst by using a silica coating process according to an embodiment.

The method according to Example 1 is shown schematically in FIG. 1.

[Comparative Example 1] Preparation of PtCo/C Using Silica Coating Process

Example 1 is repeated, except that Tween 20 is not used during the step of removing silica.

[Comparative Example 2] Preparation of PtCo/C Using $NaBH_4$ Reduction Process

First, 127 mg of Ketjen black EC300j is introduced to 400 ml of ultrapure water and treated with ultrasonic waves for 10 minutes. Next, 200 mg of $PtCl_4$ and 47 mg of $CoCl_2.6H_2O$ are added thereto, followed by agitation for 30 minutes. Then, 150 mg of $NaBH_4$ is mixed with 220 ml of ultrapure water and the mixture is added to the solution obtained as described above, followed by agitation for about 12 hours. After the completion of reduction, the platinum-cobalt catalyst supported on carbon is recovered by using a filtration system under reduced pressure, washed sufficiently with ultrapure water and ethanol alternately, and dried at 80° C. for about 12 hours. The resultant PtCo/C catalyst is heat treated at 800° C. under the atmosphere of 90 vol % of argon and 10 vol % of hydrogen for 3 hours.

[Test Example 1] Image Analysis Using High-Resolution Transmission Electron Microscopy (HR-TEM)

Figure 2:
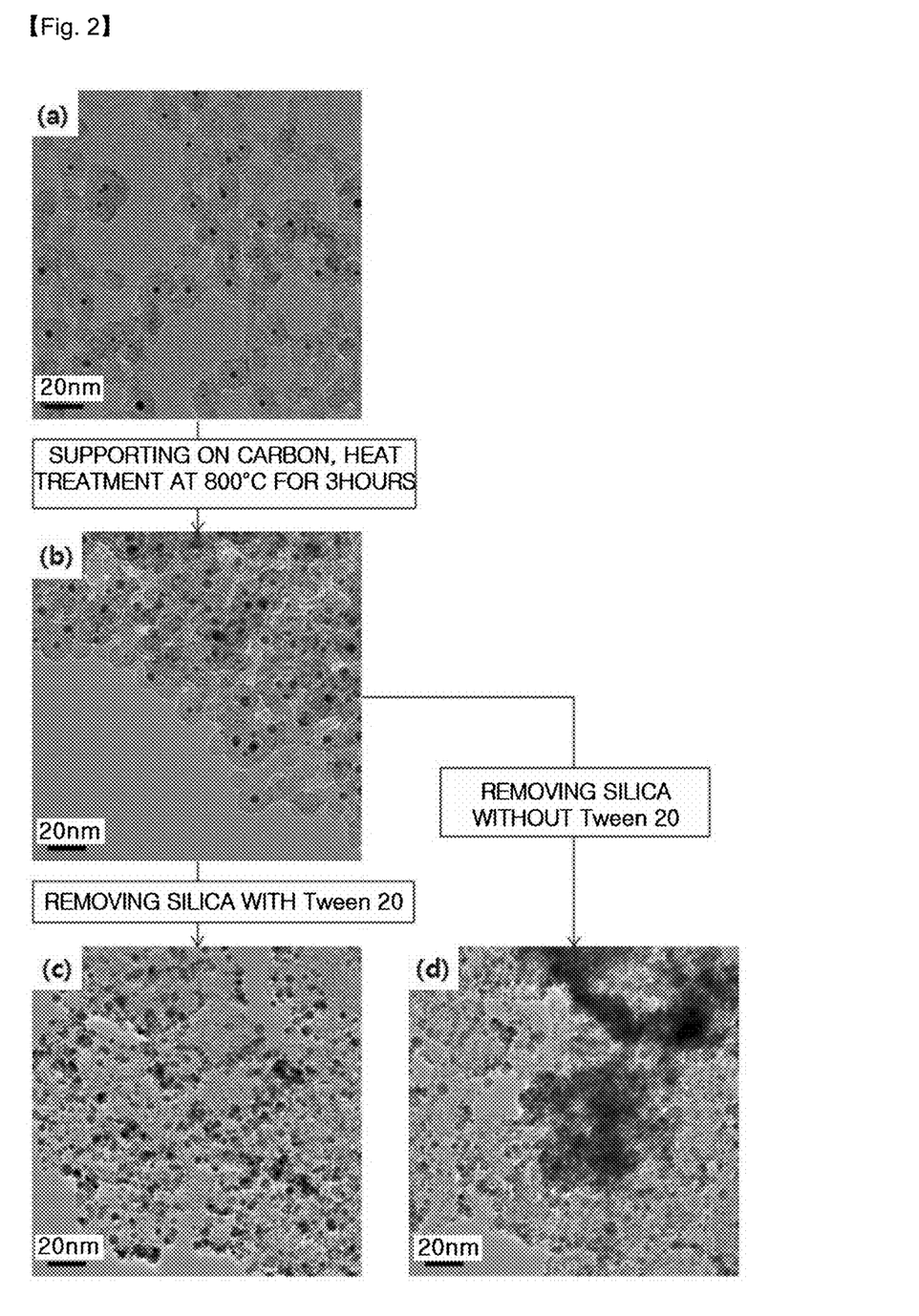
FIG. 2 is an HR-TEM (high-resolution transmission electron microscopy) image illustrating each step of the method for producing an alloy catalyst by using a silica coating process according to an embodiment.

FIG. 2 is an HR-TEM (high-resolution transmission electron microscopy) image illustrating each step of the method for producing the PtCo/C catalyst by using a silica coating process (Example 1) according to the present disclosure.

First, (a) shows PtCo alloy particles on which a silica layer is formed and corresponds to step (1) of FIG. 1. Referring to (a) of FIG. 2, only one PtCo alloy particle is surrounded with the silica layer. It can be seen that PtCo alloy particles have a size of 1-4 nm and the silica layer has an average thickness of 7 nm.

Next, (b) shows the particles of (a) after they are supported on carbon and subjected to heat treatment, and corresponds to step (3) of FIG. 1. Referring to (b) of FIG. 2, it can be seen that there is no change in particle size even after carrying out heat treatment at 800° C.

Then, (c) shows the final step of removing silica and corresponds to step (4) of FIG. 1. It can be seen that PtCo particles maintain a particle size of 4 nm or less and high dispersibility even after carrying out heat treatment at 800° C.

Finally, (d) shows particles obtained by using no surfactant during the step of removing silica (Comparative Example 1). In this case, while the alloy particles contained in the silica layer are dispersed into the surrounding solution, they form agglomerates due to the attraction force between particles. This can be seen from (d) of FIG. 2.

Therefore, it can be seen that a surfactant is required to improve the dispersibility of alloy particles upon the removal of silica. In Example 1 according to the present disclosure, Tween 20 is used.

Figure 3:
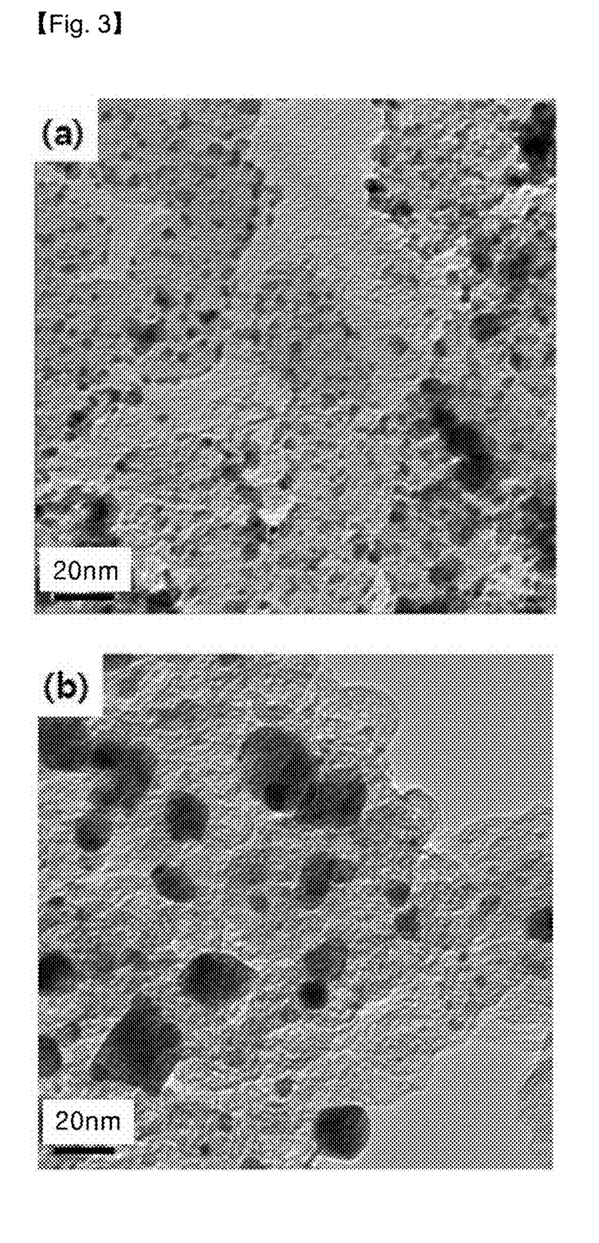
FIG. 3 is an HR-TEM image illustrating a platinum-cobalt alloy catalyst supported on carbon, obtained by using a room-temperature NaBH$_4$ reduction process, and the same catalyst heat treated at 800° C.

Meanwhile, FIG. 3 shows the HR-TEM image of the catalyst obtained by a NaBH4 reduction process using no silica coating (Comparative Example 2).

In FIG. 3, (a) shows PtCo/C before heat treatment, (b) shows the catalyst heat treated at 800° C. under the atmosphere of 90 vol % of argon and 10 vol % of hydrogen for 3 hours. It can be seen that the particle size increases from about 3 nm (before heat treatment) to 20 nm or more (after heat treatment).

[Test Example 2] X-Ray Diffraction Pattern Analysis

Figure 4:
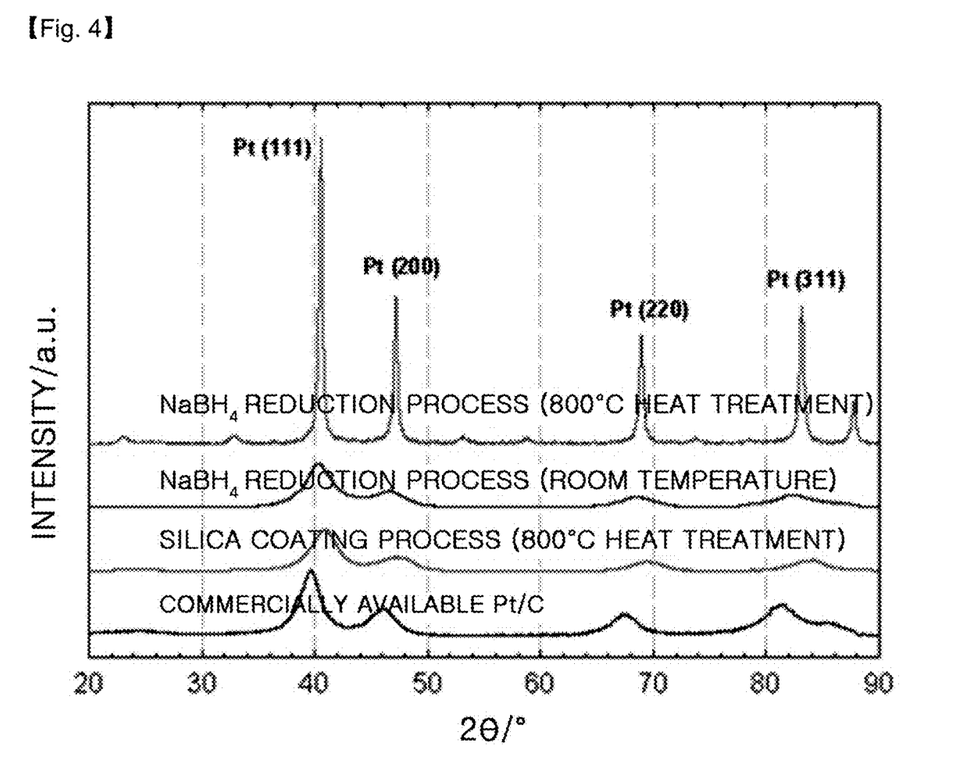
FIG. 4 shows X-ray diffraction patterns of the platinum-cobalt alloy catalysts obtained by using the silica coating process according to the present disclosure, a room-temperature NaBH$_4$ reduction process and a room-temperature NaBH$_4$ reduction process followed by heat treatment at 800° C., as well as a commercially available Pt/C catalyst.

FIG. 4 shows X-ray diffraction patterns of the platinum-cobalt alloy catalysts supported on carbon (PtCo/C), obtained by using a room-temperature $NaBH_4$ reduction process, a room-temperature $NaBH_4$ reduction process followed by heat treatment at 800° C. (Comparative Example 2) and the silica coating process according to the present disclosure (Example 1). After carrying out the analysis, the results are shown in the following Table 1.

TABLE 1

| PtCo/C Production Process<br>PtCo/C 제조방법 | (111) peak in XRD | |
|---|---|---|
| | 2 shift (°) vs commercially available Pt/C catalyst | Particle size (nm) |
| $NaBH_4$ Reduction process(RT) | +0.6 | 3.1 |
| $NaBH_4$ Reduction process (800° C. heat treatment, Comp. Ex. 2) | +0.9 | 24.6 |
| Silica coating process (800° C. heat treatment, Ex. 1) | +1.1 | 3.1 |
| Commercially available Pt/C (40 wt %, Johnson Matthey) | 0 | 4.1 |

In the X-ray diffraction patterns, the particle size is calculated by applying Pt(111) peak in a range of 2θ=39.7° to the Scherrer Formula. In addition, the alloying degree is determined through the shift degree of Pt(111) peak. As the 2θ value increases from the value in the X-ray diffraction pattern of the commercially available Pt/C catalyst, the alloying degree also increases.

In the case of PtCo/C obtained by the NaBH$_4$ reduction process at room temperature, 2θ is increased by 0.6° from the value of the commercially available Pt/C. When the above catalyst (Comparative Example 2) is heat treated at 800° C., 2θ is increased by 0.9°. This suggests that the alloy catalyst obtained at room temperature has a low alloying degree and requires heat treatment. However, the particle size increases from 3.1 nm to 24.6 nm after heat treatment. When the particle size of a catalyst increases, the catalytically active area decreases.

Meanwhile, in the case of PtCo/C obtained by using the silica coating process (Example 1), 2θ is increased by 1.1° from the value of the commercially available Pt/C. In addition, the alloying degree is increased as compared to the alloy catalyst obtained by a room-temperature NaBH$_4$ reduction process followed by heat treatment at 800° C. (Comparative Example 2). This suggests that the catalyst obtained by using the silica coating process provides a highly increased alloying degree. Further, the catalyst has the same particle size (3.1 nm) as the alloy catalyst obtained at room temperature. It can be seen that the silica coating inhibits the growth of catalyst particle size during the heat treatment.

Therefore, it can be seen that the silica coating process according to the present disclosure provides an increased alloying degree while maintaining a small particle size.

[Test Example 3] Test for Determining Pt/Co Ratio on Alloy Surface

The platinum-cobalt alloy catalysts supported on carbon (PtCo/C), obtained by using a room-temperature NaBH$_4$ reduction process, a room-temperature NaBH$_4$ reduction process followed by heat treatment at 800° C. (Comparative Example 2) and the silica coating process according to the present disclosure (Example 1) are examined by ICP (Inductively Coupled Plasma) and XPS (X-ray Photoelectron Spectroscopy) to determine the overall Pt:Co ratios and the Pt:Co ratios on the surfaces. The results are shown in the following Table 2.

TABLE 2

| | Pt:Co Atomic Ratio | |
|---|---|---|
| PtCo/C Production Process | Overall Ratio from ICP | Surface Ratio from XPS |
| NaBH$_4$ Reduction process (RT) | 3.0:1 | 2.9:1 |
| NaBH$_4$ Reduction process (800° C. heat treatment, Comp. Ex. 2) | 3.0:1 | 4.0:1 |
| Silica coating process (800° C. heat treatment, Ex. 1) | 2.9:1 | 4.1:1 |

In the case of the room-temperature NaBH$_4$ reduction process, the overall Pt:Co ratio is 3.0:1 but the Pt:Co ratio on the surface is 2.9:1, suggesting that the ratio of Co is higher on the surface. However, when heat treating the catalyst at 800° C. (Comparative Example 2), the ratio of the overall Pt:Co is the same as the ratio before heat treatment (3.0:1) but the Pt:Co ratio on the surface is 4.0:1. It can be seen from the above results that heat treatment at high temperature increases the ratio of platinum on the surface. Particularly, in the case of PtCo/C obtained by the silica coating process (Example 1), the overall Pt:Co ratio is 2.9:1 but the Pt:Co ratio on the surface is 4.1:1. Thus, it can be seen that the PtCo/C catalyst has the highest ratio of platinum on the surface.

[Test Example 4] CV (Cyclic Voltammetry) Test and Evaluation of Unit Cell Quality CV test is carried out for each of the platinum-cobalt alloy catalysts supported on carbon (PtCo/C), obtained by using a room-temperature NaBH$_4$ reduction process, a room-temperature NaBH$_4$ reduction process followed by heat treatment at 800° C. (Comparative Example 2) and the silica coating process according to the present disclosure (Example 1).

In addition, the unit cell quality is evaluated for each catalyst. As the anode, 0.4 mg/cm$^2$ of the commercially available catalyst (40 wt % Pt/C, Johnson Matthey) is used on the basis of platinum. As the cathode, 0.4 mg/cm$^2$ of each catalyst is used on the basis of metal. Then, 150 ccm of hydrogen is supplied to the anode and 150 ccm of oxygen is supplied to the cathode. The unit cell is operated under ambient pressure at a temperature of 75° C. The quality of unit cell is evaluated as the current density at 0.6V.

Figure 5:
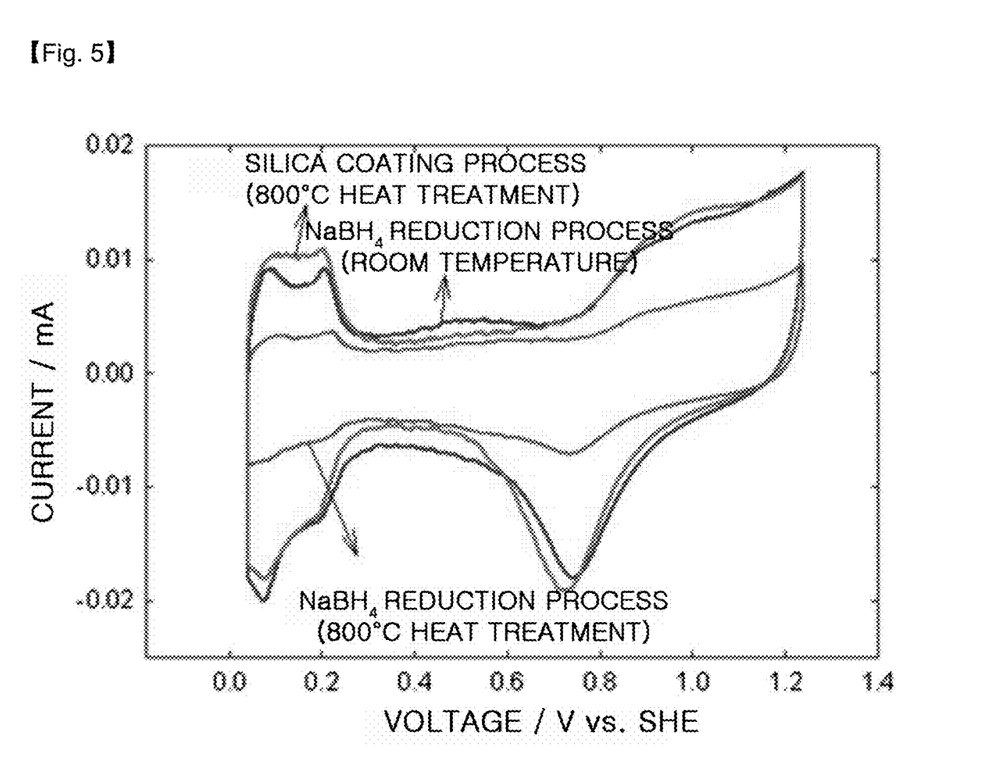
FIG. 5 is a CV graph of the platinum-cobalt alloy catalysts obtained by using the silica coating process according to the present disclosure, a room-temperature NaBH$_4$ reduction process and a room-temperature NaBH$_4$ reduction process followed by heat treatment at 800° C.
Figure 6:
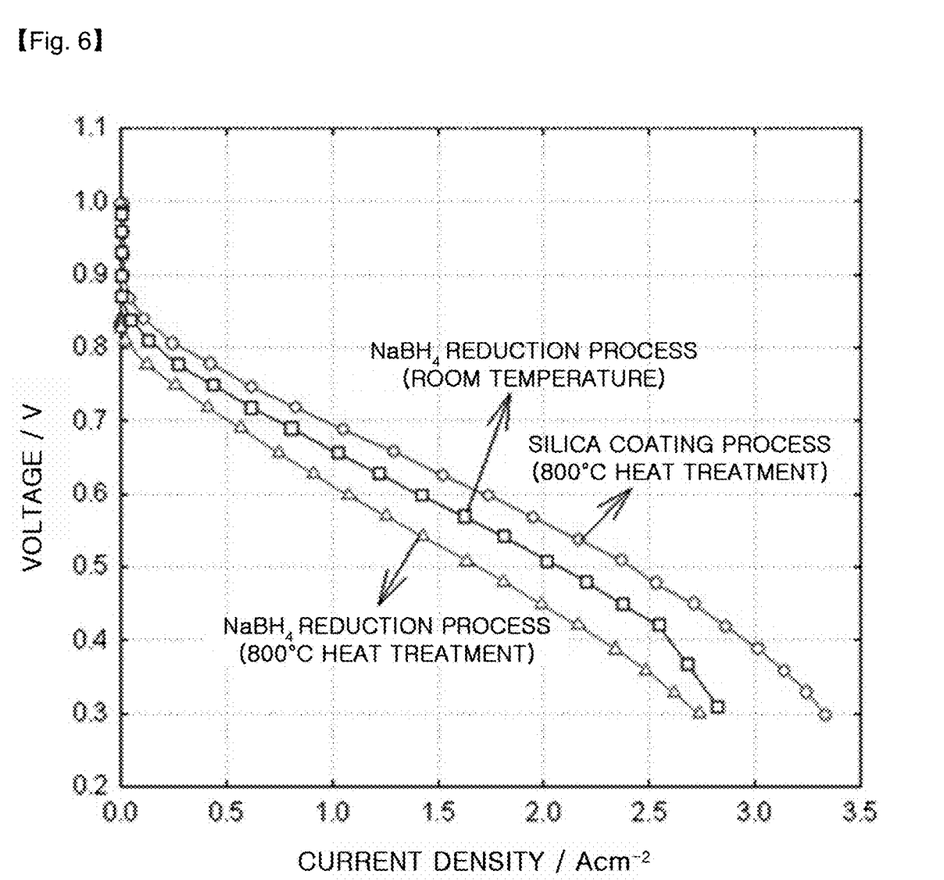
FIG. 6 is a graph illustrating the results of evaluation of unit cell quality when using the platinum-cobalt alloy catalysts obtained by using the silica coating process according to the present disclosure, a room-temperature NaBH$_4$ reduction process and a room-temperature NaBH$_4$ reduction process followed by heat treatment at 800° C.

The results are shown in FIG. 5, FIG. 6 and the following Table 3.

TABLE 3

| PtCo/C Production process | Active surface area in CV (m$^2$/g) | Current density @ 0.6 V (A/cm$^2$) |
|---|---|---|
| NaBH$_4$ Reduction process (RT) | 42.9 | 1.42 |
| NaBH$_4$ Reduction process (800° C. heat treatment, Comp. Ex. 2) | 12.6 | 1.08 |
| Silica coating process (800° C. heat treatment, Ex. 1) | 51.9 | 1.74 |

After carrying out the CV test, it can be seen that PtCo/C obtained by the silica coating process (Example 1) has a catalytically active surface area of 51.9 m$^2$/g, which is higher than 42.9 m$^2$/g in the case of the room temperature NaBH$_4$ reduction process and 12.6 m$^2$/g in the case of the a room-temperature NaBH$_4$ reduction process followed by heat treatment at 800° C. (Comparative Example 2). This is because PtCo/C obtained by using the silica coating process has an increased alloying degree through the high-temperature heat treatment step while the growth of particle size is inhibited and the dispersibility is maintained uniformly.

In the unit cell quality test, the alloy catalyst (Example 1) obtained by using the silica coating process provides the best result (1.74 A/cm$^2$ at 0.6V), while the catalyst obtained by the room-temperature NaBH$_4$ reduction process provides 1.42 A/cm$^2$ at 0.6V. Most of the transition metals present on the alloy surface are molten under the operation environment of a fuel cell due to a low equilibrium potential, resulting in degradation of the quality of a fuel cell. The alloy catalyst obtained by using the silica coating process shows increased catalytic activity by virtue of a high alloying degree and a low surface ratio of Co, and thus provides the best unit cell quality. However, the catalyst obtained by using the room-temperature NaBH$_4$ reduction process followed by heat treatment at 800° C. (Comparative Example 2) provides the lowest quality (1.08 A/cm$^2$ at 0.6V) due to its low active area.

[Test Example 5] ADT (Accelerated Durability Test)

ADT is carried out for each of the platinum-cobalt alloy catalysts supported on carbon (PtCo/C), obtained by using a room-temperature $NaBH_4$ reduction process, a room-temperature $NaBH_4$ reduction process followed by heat treatment at 800° C. (Comparative Example 2) and the silica coating process according to the present disclosure (Example 1). The results are shown in FIG. 7.

As the electrode, a gold plate coated with 1 mg/cm$^2$ of each catalyst on the basis of metal is used. As the electrolyte, 0.5M $H_2SO_4$ is used. Then, 0.4V is applied for 120 hours versus the hydrogen electrode, and the concentration of Co molten into the electrolyte is determined periodically by using ICP.

Figure 7:
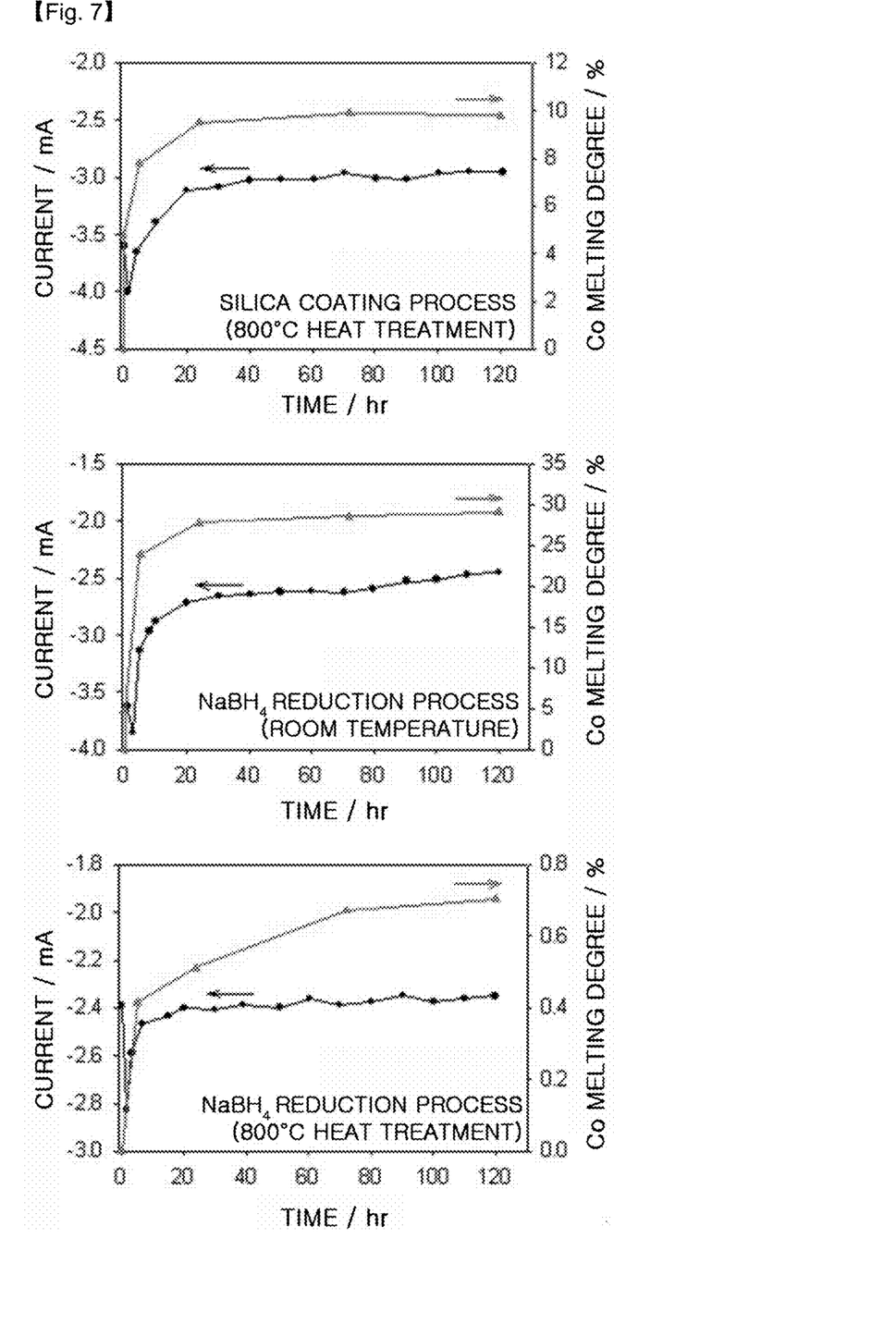
FIG. 7 is a graph illustrating the results of ADT (Accelerated Durability Test) when using the platinum-cobalt alloy catalysts obtained by using the silica coating process according to the present disclosure, a room-temperature NaBH$_4$ reduction process and a room-temperature NaBH$_4$ reduction process followed by heat treatment at 800° C.

FIG. 7 shows the amount of Co molten during ADT. In addition to this, oxygen reduction current measured at a constant voltage of 0.4V is shown. It can be seen that the oxygen reduction current decreases with the lapse of time. It can be also seen that variations in the oxygen reduction current value corresponds with variations in the amount of Co, suggesting that there is a strong causal relation between the amount of molten Co and oxygen reduction current. When the oxygen reduction current increases at the initial stage of ADT until the electrode is activated to the highest degree and reaches to the maximum value, it starts to decrease and becomes have a constant value within 120 hours. In addition, melting of Co occurs rapidly during the initial stage of ADT, and then is stabilized.

In the case of the alloy catalyst (Example 1) obtained by using the silica coating process, 9.8% of Co is molten during ADT. This is very small as compared to the catalyst obtained by the room-temperature $NaBH_4$ reduction process (29.1%). Meanwhile, in the case of the catalyst (Comparative Example 2) obtained by the room-temperature $NaBH_4$ reduction process followed by heat treatment at 800° C., 0.7% of Co is molten due to a decreased active area caused by an increase in particle size.

INDUSTRIAL APPLICABILITY

As can be seen from the foregoing, the silica coating process according to the present disclosure is suitable for the production of a high-quality and high-durability catalyst for fuel cells.

The invention claimed is:

1. A method for producing an alloy catalyst supported on carbon, comprising the steps of:
   (1) dispersing ahoy particles, having a size of 2-10 nm, into a mixed solution of water with alcohol, introducing a silica precursor thereto, carrying out sol-gel reaction in the presence of a basic catalyst to obtain silica-coated ahoy particles,
   the silica precursor is selected from TEOS (tetraethyl orthosilicate), TMOS (tetramethyl orthosilicate), TBOS (tetrabutyl orthosilicate) and a mixture thereof,
   the basic catalyst in the sol-gel reaction is selected from aqueous ammonia, sodium hydroxide and potassium hydroxide,
   the sol-gel reaction is carried out at 10-50° C. for 3-48 hours under agitation;
   (2) recovering the silica-coated ahoy particles;
   (3) supporting the recovered silica-coated alloy particles onto a carbon carrier to obtain silica-coated alloy particles supported on carbon; wherein the silica coating has a thickness of 3-50 nm;
   (4) heat treating the silica-coated alloy particles supported on carbon to increase the alloying degree, wherein the alloy particles retain the size of 2-10 nm; and
   (5) removing the silica coating from the silica-coated alloy particles by using either (i) aqueous hydrofluoric acid (HF) solution and a surfactant or (ii) inorganic base solution and a surfactant; wherein the surfactant is a non-ionic surfactant selected from polyoxyethylene glycol sorbitan fatty acid esters, sorbitan fatty acid esters, and polyoxyethylene alkyl ethers;
   wherein the heat treatment in step (4) is carried out under inert gas atmosphere of argon or nitrogen, or mixed gas atmosphere of argon or nitrogen with hydrogen at 400-1000° C. for 2-4 hours to increase the alloying degree.

2. The method for producing an alloy catalyst supported on carbon according to claim 1, wherein the alloy particle comprises an alloy of at least two metals selected from platinum, palladium, gold, iridium, ruthenium, vanadium, chrome, manganese, iron, cobalt, nickel, copper, zinc and titanium.

3. The method for producing an alloy catalyst supported on carbon according to claim 1, wherein the carbon carrier is at least one selected from carbon black, carbon nanotubes, carbon nanofibers, carbon nanocoils and carbon nanocages.

4. The method for producing an alloy catalyst supported on carbon according to claim 1, wherein the aqueous inorganic base solution is aqueous sodium hydroxide (NaOH) solution or aqueous potassium hydroxide (KOH) solution.

* * * * *

UNITED STATES PATENT AND TRADEMARK OFFICE
CERTIFICATE OF CORRECTION

PATENT NO. : 10,950,870 B2  
APPLICATION NO. : 16/585941  
DATED : March 16, 2021  
INVENTOR(S) : Hansung Kim et al.

Page 1 of 1

It is certified that error appears in the above-identified patent and that said Letters Patent is hereby corrected as shown below:

In the Claims

In Column 12, Claim 1, Line 1, "dispersing ahoy particles" should read -- dispersing alloy particles --

In Column 12, Claim 1, Line 5, "silica-coated ahoy particles" should read -- silica-coated alloy particles --

In Column 12, Claim 1, Line 14, "silicia-coated ahoy particles" should read -- silicia-coated alloy particles --

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*